United States Patent [19]

Yamawaki et al.

[11] Patent Number: 4,812,987
[45] Date of Patent: Mar. 14, 1989

[54] WAVE SHAPING CIRCUIT

[75] Inventors: Chiaki Yamawaki, Nara; Taizo Sasada, Hirakata; Tetsuo Iwaki, Tenri; Katsubumi Koyanagi, Nara, all of Japan

[73] Assignee: Sharp Kabushiki Kaisha, Osaka, Japan

[21] Appl. No.: 795,231

[22] Filed: Nov. 5, 1985

[30] Foreign Application Priority Data

Nov. 6, 1984 [JP] Japan .................. 59-234263
Oct. 16, 1985 [JP] Japan .................. 60-231978

[51] Int. Cl.$^4$ .................. G06F 7/38; H03B 1/00
[52] U.S. Cl. .................. 364/724.01; 328/165
[58] Field of Search .................. 364/724, 754; 328/165, 328/167, 164; 379/109; 84/1.01

[56] References Cited

U.S. PATENT DOCUMENTS

| | | | |
|---|---|---|---|
| 3,579,123 | 5/1971 | Koga | 328/164 |
| 4,034,196 | 7/1977 | Butterweck et al. | 364/724 |
| 4,283,788 | 8/1981 | Tamburelli | 364/724 |
| 4,528,678 | 7/1985 | Udren | 328/165 |

FOREIGN PATENT DOCUMENTS

| | | |
|---|---|---|
| 109837 | 5/1984 | European Pat. Off. . |
| 59-924105 | 5/1984 | Japan . |
| 2085268 | 4/1982 | United Kingdom . |

OTHER PUBLICATIONS

National Convention Record, 1984, The Institute of Electronics and Communication Engineers of Japan (Part 1).
The Technology Research Report, 1984, The Institute of Electronics and Communication Engineers of Japan.

Primary Examiner—Gary V. Harkcom
Assistant Examiner—Long Thanh Nguyen
Attorney, Agent, or Firm—Birch, Stewart, Kolasch & Birch

[57] ABSTRACT

A wave shaping circuit includes a digital sampling circuit for sampling an input signal and producing a digital signal. The sampled signal is detected by a sign detector for detecting whether it is positive or negative. A unit difference generator is provided for generating a unit difference which is equal to a difference increased, during one sampling cycle, in a positive or negative direction as detected by the sign detector. A register is provided for storing a summed difference obtained in the previous sampling cycle. The summed difference is multiplied by a predetermined coefficient which is between 0 and 1 so that the product changes exponentially. A first adder is provided for adding the summed difference multiplied by the coefficient with the unit difference. The added result is stored in the register. A second adder is provided for adding the sampled input signal with the summed signal stored in the register, and producing a corrected signal.

8 Claims, 12 Drawing Sheets

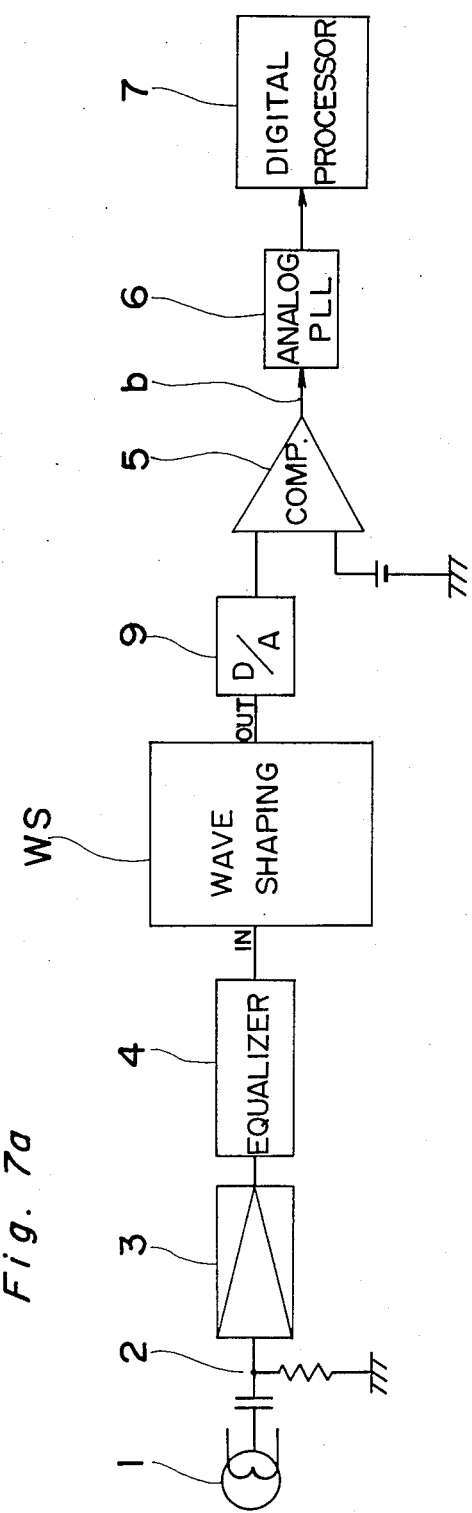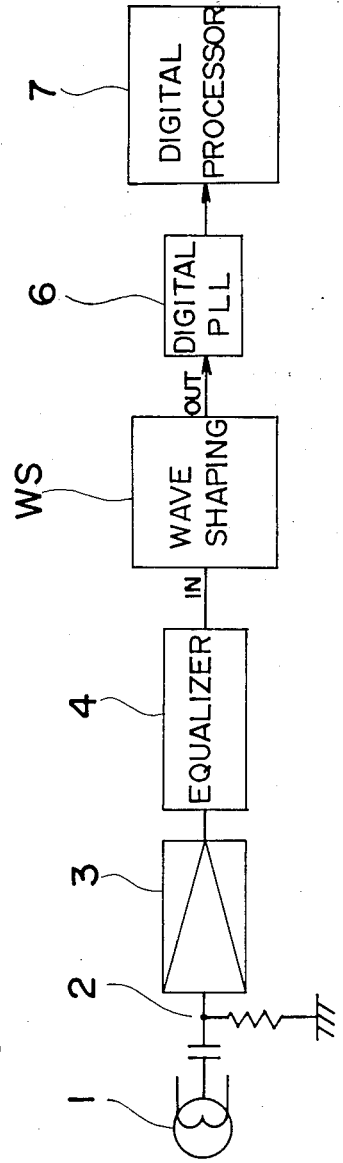
Fig. 7a
Fig. 7b

WAVE SHAPING CIRCUIT

BACKGROUND OF THE INVENTION

1. Field of the Invention

The present invention relates to a digital signal reproducing device and, more particularly, to a wave shaping circuit for correcting the waveform of the digital signal, pulse coded signal, or read out from a recording medium, such as a magnetic member.

2. Description of the Prior Art

Recently, a development has been made on an analog signal recording/reproducing system such that the analog signal, such as an audio signal, is first converted to a digital signal. Then, the converted digital signal is modulated, by a pulse code modulation, to a self-clocked type digital signal. The modulated digital signal is recorded on a recording medium, such as a magnetic tape. A reproducer for reproducing the recorded signal is shown in FIG. 1. The pulse code modulation may be any known modulation, such as a 3 PM (three position modulation), or a MNRZI (modified non-return to zero inverted).

In FIG. 1, reference number 1 is a magnetic head, 2 is an AC coupling, 3 is a pre-amplifier, 4 is an equalizer, 5 is a comparator, 6 is an analog PLL circuit and 7 is a digital signal processing circuit. In the case of a multi-channel type recording/reproducing system, the circuit shown in FIG. 1 would be responsive to only one channel of a multi-channel system. A duplicate circuit would be needed for each additional channel used so that the number of circuits would equal the number of channels.

As shown in FIG. 2, the waveform a represents the signal recorded in the magnetic tape. The waveform b represents the signal produced from equalizer 4. The reproduced signal of waveform b carries an unwanted DC component, as indicated by the dotted line c, caused by various factors such as the drooping observed after the AC coupling 2. When the signal (waveform b) is compared with a constant DC level (waveform d), comparator 5 produces a pulse signal shown by waveform e, which is different from the original signal (waveform a) as recorded in the tape. Therefore, the problem is that the signal processed in the stage after comparator 5 will not represent the original signal.

SUMMARY OF THE INVENTION

The object of the present invention is to develop a wave-shaping circuit to substantially solve the above described problem and to provide a wave shaping circuit which can eliminate unwanted DC component.

It is also an object of the present invention to provide a wave shaping circuit which is simple in the structure and can readily be manufactured at low cost.

In accomplishing these and other objects, a wave shaping circuit according to the present invention comprises a digital sampling circuit for sampling an input signal and producing a digital signal. The sampled signal is detected by a sign detector for detecting whether it is positive or negative. A unit difference generator is provided for generating a unit difference which is equal to a difference increased, during one sampling cycle, in a positive or negative direction as detected by the sign detector. A register is provided for storing a summed difference obtained in the previous sampling cycle. The summed difference is multiplied by a predetermined coefficient which is between 0 and 1 so that the product changes exponentially. A first adder is provided for adding the multiplied summed difference with the unit difference. The added result is stored in the register. A second adder is provided for adding the sampled input signal with the previously added result stored in the register, and to produce a corrected signal.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIGS. 7a and 7b each shows a block diagram of a reproducer employing a wave shaping circuit of the present invention;

DESCRIPTION OF THE PREFERRED EMBODIMENTS

Before the description proceeds to the preferred embodiment of the present invention, the manner in which the wave shaping is carried out will be explained from the theoretical viewpoint.

Figure 1:
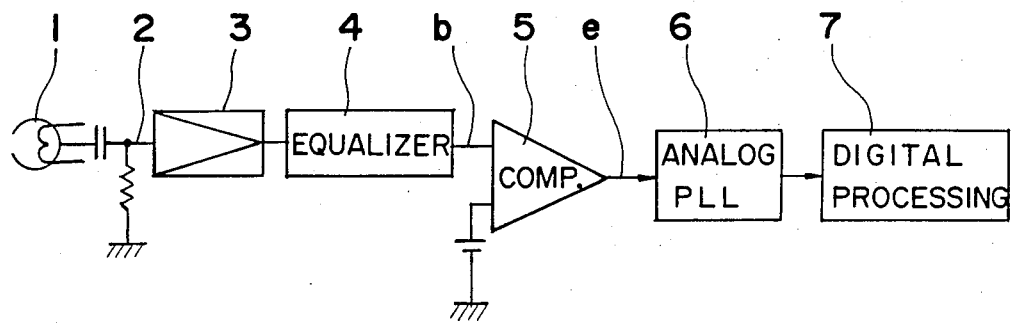
FIG. 1 is a block diagram of a reproducer according to the prior art.
Figure 2:
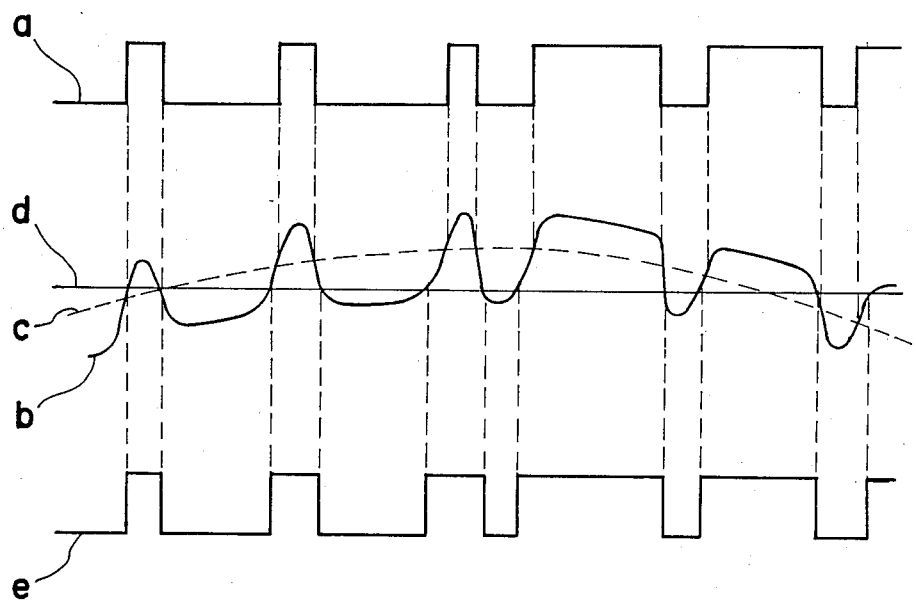
FIG. 2 is a graph showing waveforms obtained from the circuit of FIG. 1.
Figure 4:
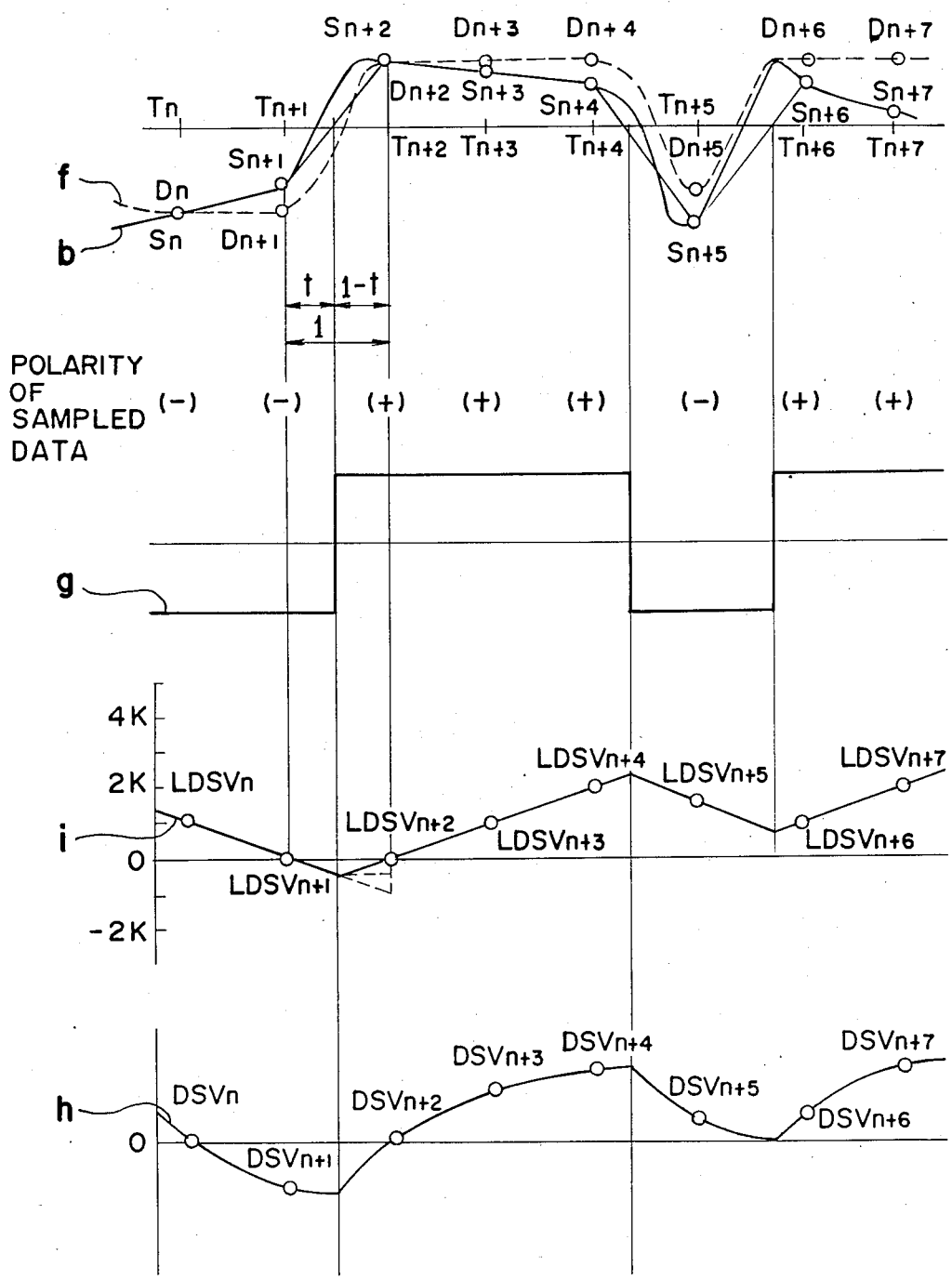
FIG. 4 is a graph showing waveforms describing the operation of the first embodiment.

As mentioned above, the signal from equalizer 4 carries unwanted DC component, such as shown by waveform b in FIG. 2. The same waveform b is shown in FIG. 4, first row in an enlarged scale. In FIG. 4, when the unwanted DC component is removed, the waveform b will change to waveform f shown by a dotted line. Thus, the signal represented by the waveform f will be the corrected signal. In other word, the purpose of the wave shaping circuit of the present invention is to receive the raw signal (waveform b) and produce the corrected signal (waveform f).

According to the present invention, the signal processing carried out in the wave shaping circuit is in digital form. Therefore, the raw signal (waveform b) is sampled at a predetermined sampling rate $\theta$. In the drawings, $T_n$, $T_{n+1}$, $T_{n+2}$, $T_{n+3}$, ... represent the sampling times. Also, $S_n$, $S_{n+1}$, $S_{n+2}$, $S_{n+3}$, ... represent the values of the sampled raw signal, and $D_n$, $D_{n+1}$, $D_{n+2}$, $D_{n+3}$, ... represent the values of corrected signal.

To obtain the values $D_n$ of the corrected signal, it is necessary to find a difference $DSV_n$ (DSV represents Digital Sum Value) between the raw signal $S_n$ and the corrected signal $D_n$, and add the difference to the raw signal $S_n$. From the practical view point, however, it is not possible to find the difference between the raw signal $S_n$ and the corrected signal $D_n$ at the present sampling cycle, since at the present sampling cycle, the corrected signal $D_n$ is still unknown. Thus, according to the present invention, the correction is carried out by using the difference $DSV_{n-1}$ obtained in the previous sampling cycle. Thus, the following formula (1) is obtained:

$$D_n = S_n + DSV_{n-1} \times M \tag{1}$$

where M is a rate of increase of the difference during one sampling period.

Next, the manner in which the difference $DSV_n$ is obtained will be described.

When the polarity of the raw signal (waveform b) is positive, the difference $DSV_n$ increases exponentially in the positive direction, and when it is negative, the difference $DSV_n$ increases exponentially in the negative direction. In FIG. 4, waveform g shows the polarity of the raw signal, and waveform h shows the difference $DSV_n$ which changes exponentially. Therefore, at the zero crossing point (ZCP) of the raw signal, the direction of the inclination of the difference $DSV_n$ changes.

According to the present invention, the difference $DSV_n$ is obtained by using the difference $DSV_{n-1}$ obtained in the previous sampling cycle. Therefore, from the above description, it is apparent that the formula for obtaining the difference $DSV_n$ will be different for the two different cases: (i) a case when no ZCP exist in the raw signal $S_n$ during a period between times $T_{n-1}$ and $T_n$ (same polarity case); (ii) and a case when ZCP exists in the same period (different polarity case).

Also, according to the present invention, the difference $DSV_n$ changes exponentially, as shown by waveform h, but for the purpose of better understanding of the invention, a quasi difference $LDSV_n$ that changes linearly (waveform i) will also be used.

(i) Same Polarity Case

In the same polarity case, such as between times $T_{n+2}$ and $T_{n+3}$ or times $T_{n+3}$ and $T_{n+4}$, the quasi difference $LDSV_n$ changes by a constant amount K. Therefore, the quasi difference $LDSV_n$ (waveform i) may be given by the following equation:

$$LDSV_n = LDSV_{n-1} + K \tag{2}$$

or $$LDSV_n = LDSV_{n-1} - K. \tag{2'}$$

These two equation (2) and (2') may be generally expressed as:

$$LDSV_n = LDSV_{n-1} + Sign \times K \tag{3}$$

in which Sign represents plus when the raw signal (waveform b) is in the positive region, and minus when it is in the negative region. In some cases, the constant amount K may be considered as "1".

Equation (3) indicates that the quasi difference $LDSV_n$ becomes greater after each sampling cycle, provided that the raw signal is in the same polarity. The amount of difference increased after each sampling cycle is herein called a unit difference, which corresponds to (Sign×K) in equation (3), and the difference summed up to the previous sampling cycle is herein called a summed difference, which corresponds to $LDSV_{n-1}$ in equation (3).

Now, in the case of exponential change, the difference $DSV_n$ (waveform h) may be expressed as follows:

$$DSV_n = DSV_{n-1} \times L + Sign \times K \tag{4}$$

wherein L is an attenuation coefficient and is between 0 and 1. The equations (3) and (4) are very similar to each other. The difference is that the summed difference $DSV_{n-1}$ is multiplied by coefficient L.

Next, to prove that equation (4) changes exponentially.

It is assumed that:

$$DSV_n + a = (DSV_{n-1} + a) \times L \tag{5}$$

This equation is changed to:

$$DSV_n = DSV_{n-1} \times L + A \times L - a. \tag{5'}$$

From equations (4) and (5), $$a \times L - a = J \tag{6}$$

in which $J = Sign \times K$.
Thus, $$a = J/(L-1). \tag{6'}$$

When the "a" in equation (5) is substituted by equation (6'), the following equation is obtained.

$$= [DSV_{n-1} + J/(L-1)] \times L$$
$$= [DSV_{n-2} + J/(L-1) \times L] \times L$$
$$—$$
$$—$$
$$—$$
$$= [DSV_0 + J/(L-1)] \times L^n$$

Therefore, $$\begin{aligned} DSV_n &= [DSV_0 + J/(L-1)] \times L^n - J/(L-1) \\ &= J/(L-1) - J/(L-1) - DSV_0] \times L^n \end{aligned} \tag{7}$$

Figure 5:
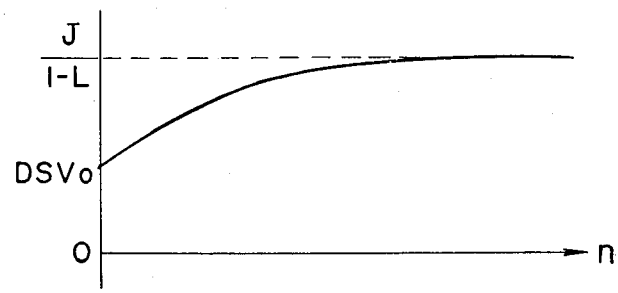
FIG. 5 is a graph showing that a difference DSV changes exponentially.

When the attenuation coefficient L is between 0 and 1, the difference $DSV_n$ as given by equation (7) changes exponentially, as shown by a curve in FIG. 5.

(ii) Different Polarity Case

In the different polarity case, such as between times $T_{n+1}$ and $T_{n+2}$ or times $T_{n+4}$ and $T_{n+5}$, the quasi difference $LDSV_n$ does not change by a constant amount K. For example, to obtain a quasi difference $LDSV_{n+2}$ the following calculations are carried out. First, it is assumed that in FIG. 4 the line of the waveform b extending between points $S_{n+1}$ and $S_{n+2}$ is straight, and a period between times $T_{n+1}$ and $T_{n+2}$ is equal to 1. When the zero crossing is effected at a time t after time $T_{n+1}$, the following relationship can be obtained:

$$S_{n+1}:-S_{n+2}=t:1-t$$

Thus, $$t=S_{n+1}/(S_{n+1}-S_{n+2}). \quad (8)$$

If the gradient of the linear waveform i is assumed to be either $+K$ or $-K$, the quasi difference $LDSV_{n+2}$ may be expressed as follows:

$$\begin{aligned}LDSV_{n+2} &= LDSV_{n+1} + (-t)K + (1-t)K \quad (9)\\ &= LDSV_{n+1} + (1-2t)K\end{aligned}$$

Thus, if $K=1$, $$LDSV_{n+2}=LDSV_{n+1}+(1-2t) \quad (9')$$

is obtained. Equation (9) is applicable to a case when the broken line of waveform i points downward as in the period between times $T_{n+1}$ and $T_{n+2}$. For the case when the broken line points upward as in the period between times $T_{n+4}$ and $T_{n+5}$, equation (9) can be revised as:

$$LDSV_{n+5}=LDSV_{n+4}-(1-2t) \quad (9'')$$

In general, equations (9) and (9'') may be expressed as:

$$LDSV_n=LDSV_{n-1}+\text{Sign}\times(1-2t)K \quad (10)$$

Now, in the case of the exponential change, the difference $DSV_n$ (waveform h) may be expressed as follows:

$$DSV_n=DSV_{n-1}\times L+\text{Sign}\times(1-2t)K \quad (11)$$

wherein L is an attenuation coefficient between 0 and 1. By multiplying $DSV_{n-1}$ by the coefficient L, the difference $DSV_n$ will change exponentially. The same proof from above can be applied to this equation for proving the exponential change. In equation (11), the unit difference is:

$$\text{Sign}\times(1-2t)K,$$

and the summed difference is $DSV_{n-1}$.

The above description can be summarized as follows. For correcting the raw signal (waveform b) under
(i) the same polarity case, the equations $$D_n=S_n+DSV_{n-1}\times M \quad (1)$$

$$DSV_n=DSV_{n-1}\times L+\text{Sign}\times K \quad (4)$$

are used; and under
(ii) the different polarity case, the equations $$D_n=S_n+DSV_{n-1}\times M \quad (1)$$

$$DSV_n=DSV_{n-1}\times L+\text{Sign}\times(1-2t)K \quad (11)$$

are used. The difference in these two cases is how the unit difference is expressed. The wave shaping circuit according to the first embodiment of the invention is formed based on the above described theory.

FIRST EMBODIMENT

Figure 3:
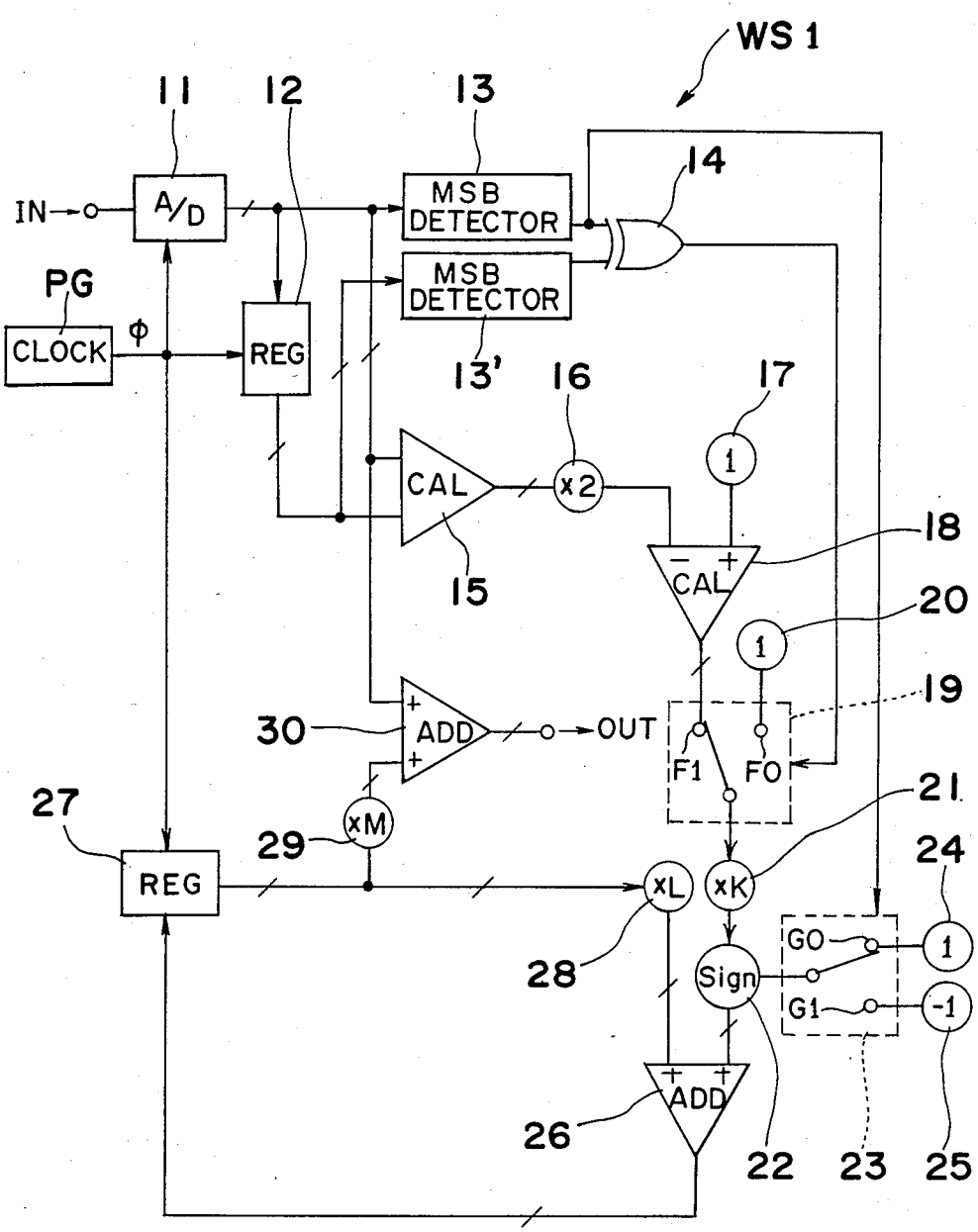
FIG. 3 is a circuit diagram of a wave shaping circuit according to a first embodiment of the present invention.

Referring to FIG. 3, a wave shaping circuit WS1 of the first embodiment has an input IN for receiving a signal (waveform b) from equalizer 4. The input is connected to an A/D converter 11 which is operated by a clock pulse $\theta$ from a clock pulse generator PG so that the raw signal (waveform b) is sampled at the rate of the frequency of the clock pulse $\theta$. Accordingly, A/D converter 11 produces a sampled data $S_n$ in a digital form, such as in a H-bit signal. Since the H-bit signal is expressed by the two's complement, as indicated in Table 1 below,

TABLE 1

| Level of the sampled data | H-bit digital signal (in 2's complement) |
| --- | --- |
| +3 | 000 ... 011 |
| +2 | 000 ... 010 |
| +1 | 000 ... 001 |
| 0 | 000 ... 000 |
| −1 | 111 ... 111 |
| −2 | 111 ... 110 |
| −3 | 111 ... 101 |

(Levels between +3 and −3 are listed as an example.)

the most significant bit (MSB) of the H-bit signal takes a "0" when the sampled data is positive or equal to zero, and takes a "1" when it is negative. The H-bit signal $S_n$ produced from A/D converter 11 is applied to the following: an H-bit register 12, an MSB detector 13, a calculator 15 and an adder 30. The H-bit register is also operated by the clock pulse $\theta$ such that when it receives the new H-bit signal $S_n$, it produces the H-bit signal $S_{n-1}$ stored during the previous sampling cycle. The delayed H-bit signal $S_{n-1}$ is applied to an MSB detector 13' and also to calculator 15.

Calculator 15 receives H-bit signals $S_n$ and $S_{n-1}$ and carries out the following calculation $$t=S_{n-1}/(S_{n-1}-S_n) \quad (8)$$

so as to obtain a time length t. The obtained time length t is multiplied by 2 in a multiplier 16 and then applied to a calculator 18 for calculating (1−2t) in which "1" if obtained from a constant producing circuit 17. Thus, calculator 18 produces a signal representing (1−2t).

The signals produced from MSB detectors 13 and 13' are applied to an EXCLUSIVE OR gate 14 and further to a first switching circuit 19. The first switching circuit 19 has an arm which is connected to a terminal F1 when the signal sent from EXCLUSIVE OR gate 14 is a "1" and to a terminal F0 when it is a "0". The EXCLUSIVE OR gate produces "1" when the signals from MSB detectors 13 and 13' are different, indicating that the zero crossing point exists between the present sampling time and the sampling time of one cycle before, for example between sampling times $T_{n-1}$ and $T_n$. In this case, the first switching circuit 19 has its arm connected to terminal F1 so to send a signal representing (1−2t) to a multiplier 21. On the contrary, when the signals from MSB detectors 13 and 13' are the same, EXCLUSIVE OR gate produces "0" indicating that the data obtained at the most recent two subsequent sampling times, e.g., $S_{n-1}$ and $S_n$, have the same polarity. In this case, the first switching circuit 19 connects a constant generator 20, for generating "1", to multiplier 21.

Also, the signal produced from MSB detector 13 is applied to a second switching circuit 23. When the signal sent from MSB detector 13 is "1" indicating that the present signal $S_n$ is negative, an arm of the second switching circuit 23 is connected to a terminal G1. Thus, "−1" as generated from generator 25 is sent to a sign setting circuit 22. On the contrary, when the signal sent from MSB detector 13 is "0" indicating that the present signal $S_n$ is positive, the arm of the second switching circuit 23 is connected to a terminal G0. Thus, "1" as generated from generator 24 is sent to sign setting circuit 22. A signal produced from sign setting circuit 22 represents the unit difference.

The signal produced from sign setting circuit 22, representing the unit difference, is applied to an adder 26 which also receives a signal from a multiplier 28. The signal produced from adder 26 is applied to a register 27, driven by clock pulse $\theta$. Thus, register 27 stores and produces the summed difference. The output signal from register 27 is applied to a multiplier 29 and also to a multiplier 28. Thus, the multiplier 28 produces a signal representing the summed difference multiplied by a coefficient L. As indicated in FIG. 4, multipliers 16, 21, 28 and 29 are for effecting the multiplication of $\times 2$, $\times K$, $\times L$ and $\times M$, respectively.

Referring to FIG. 7a, wave shaping circuit WS according to the present invention is so connected as to receive the signal (waveform b) from equalizer 4, and provides an output signal to a D/A converter 9 and further to analog PLL 6. If a digital PLL is used, D/A converter 9 and comparator 5 are not necessary, as shown in FIG. 7b. A detail of digital PLL is disclosed, for example, in a Japanese Patent Publication (unexamined) No. 59-92410.

Next, the operation of wave shaping circuit WS1 of the first embodiment will be described under two different cases: (i) same polarity case; and (ii) different polarity case.

(i) Same Polarity Case

For this case, the operation at the sampling time of $T_{n+3}$ (FIG. 4) will be described. At this sampling time $T_{n+3}$, register 12 is stored with a signal $S_{n+2}$ and register 27 is stored with a signal $DSV_{n+2}$. Accordingly, when A/D converter 11 produces a signal $S_{n+3}$, adder 30 produces a corrected signal $(D_{n+3} = S_{n+3} + DSV_{n+2} \times M)$. This operation is based on equation (1).

Furthermore, wave shaping circuit WS1 calculates $DSV_{n+3}$ for use in the next sampling cycle, in the following manner.

When A/D converter 11 produces the signal $S_{n+3}$, H-bit register 12 produces a signal $S_{n+2}$. Thus, calculator 15 produces a signal t which can be expressed as follows:

$$t = S_{n+2}/(S_{n+2} - S_{n+3}) \qquad (8)$$

Using the obtained signal t, calculator 18 produces a signal representing $(1-2t)$. Under the case (i), the signal $(1-2t)$ will not be used.

Since both signals $S_{n+2}$ and $S_{n+3}$ are positive, EXCLUSIVE OR gate 14 produces a "0", thereby effecting first switching circuit 19 to connect constant generator 20 with multiplier 21. Also, since signal $S_{n+3}$ is positive, MSB detector 13 produces a "0", thereby effecting second switching circuit 23 to connect constant generator 24 with sign setting circuit 22. Thus, the line after sign setting circuit 22 and directed to one input of adder 26 carries a signal representing the unit difference $+K$. The other input of adder 26 receives a signal $(DSV_{n+2} \times L)$. Accordingly, adder 26 produces a summed difference signal $(DSV_{n+2} \times L + K)$ which will be stored in register 27 as a new signal $DSV_{n+3}$ for use in the next sampling cycle. This operation is based on equation (4).

(ii) Different Polarity Case

For this case, the operation at the sampling time of $T_{n+2}$ (FIG. 4) will be described. At this sampling time $T_{n+2}$, register 12 is stored with a signal $S_{n+1}$ and register 27 is stored with a signal $DSV_{n+1}$. Accordingly, when A/D converter 11 produces a signal $S_{n+2}$, adder 30 produces a corrected signal $(D_{n+2} = S_{n+2} + DSV_{n+1} \times M)$. This operation is based on equation (1).

Furthermore, wave shaping circuit WS1 calculates $DSV_{n+2}$ for use in the next sampling cycle, in the following manner.

When A/D converter 11 produces the signal $S_{n+2}$, H-bit register 12 produces a signal $S_{n+1}$. Thus, calculator 15 produces a signal t which can be expressed as follows:

$$t = S_{n+1}/(S_{n+1} - S_{n+2}) \qquad (8)$$

Using the obtained signal t, calculator 18 produces a signal representing $(1-2t)$.

Since signals $S_{n+1}$ and $S_{n+2}$ have different polarities, EXCLUSIVE OR gate 14 produces a "1", thereby effecting first switching circuit 19 to connect calculator 18 with multiplier 21. Also, since signal $S_{n+2}$ is positive, MSB detector 13 produces a "0", thereby effecting second switching circuit 23 to connect constant generator 24 with sign setting circuit 22. Thus, the line after sign setting circuit 22, which is directed to one input of adder 26, carries a signal representing the unit difference $+[K \times (1-2t)]$. The other input of adder 26 receives a signal $(DSV_{n+1} \times L)$. Accordingly, adder 26 produces a summed difference signal $[DSV_{n+1} \times L + K(1-2t)]$ which will be stored in register 27 as a new signal $DSV_{n+2}$ for use in the next sampling cycle. This operation is based on equation (11).

Figure 6:
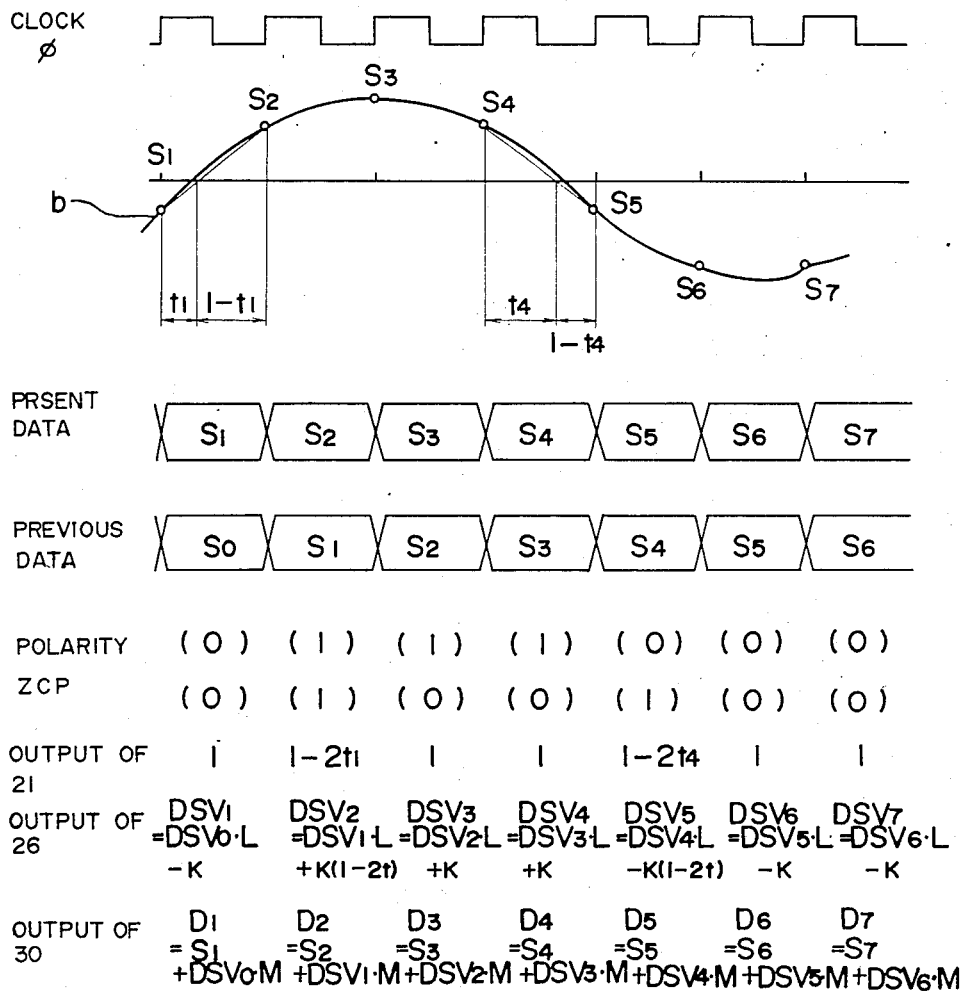
FIG. 6 is a graph showing an operation of the circuit of FIG. 3.

Other examples of operations are shown in a chart given in FIG. 6.

SECOND EMBODIMENT

Figure 8:
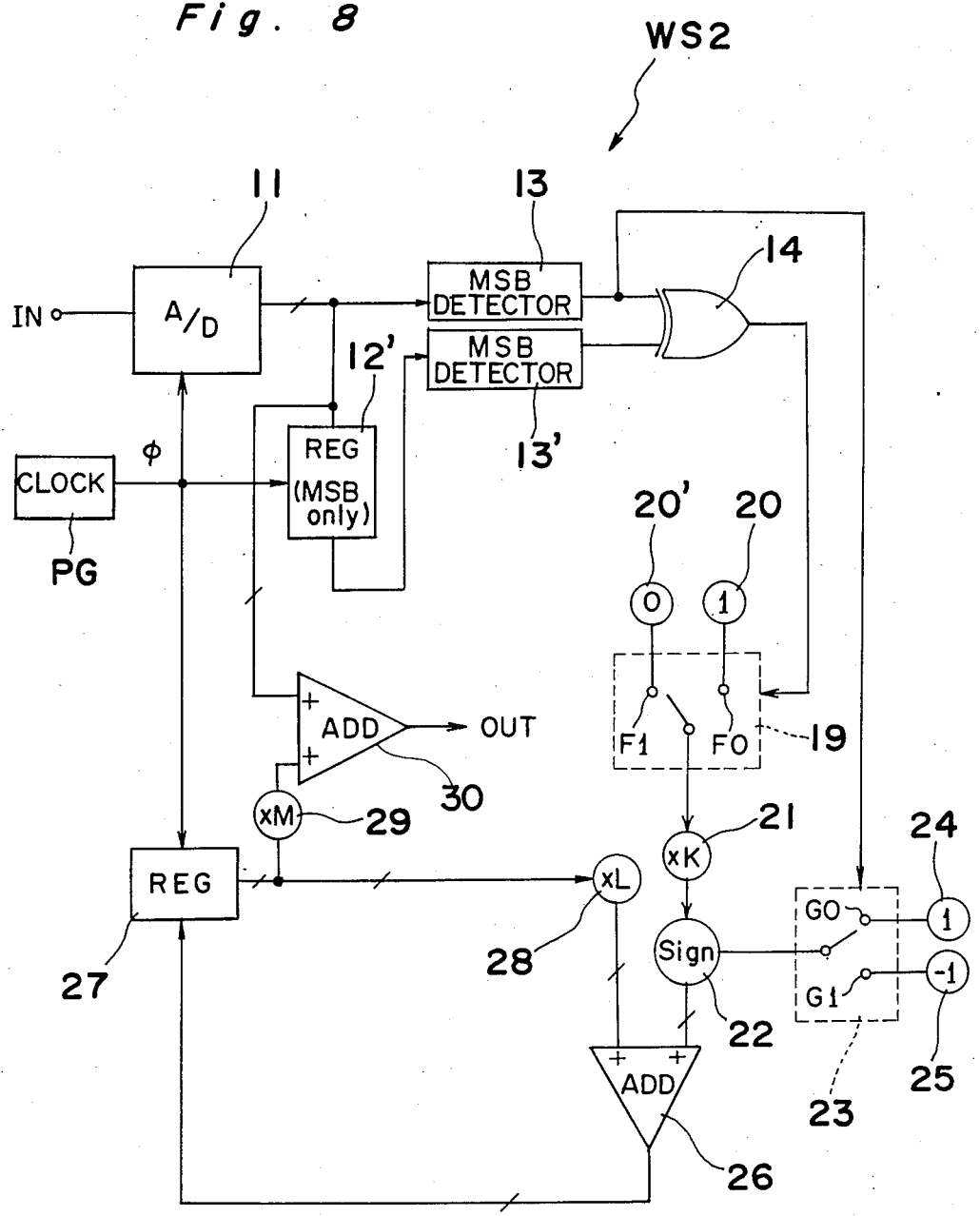
FIG. 8 is a circuit diagram of a wave shaping circuit according to a second embodiment of the present invention.

Referring to FIG. 8, a wave shaping circuit WS2 according to a second embodiment of the present invention is shown. When compared with the first embodiment, the circuit for calculating the amount $(1-2t)$ is replaced with a circuit for generating a "0". In other words, circuit elements 15, 16, 17 and 18 are replaced with a "0" generator 20'. Furthermore, register 12' is a 1-bit register for storing only the MSB.

Figure 9:
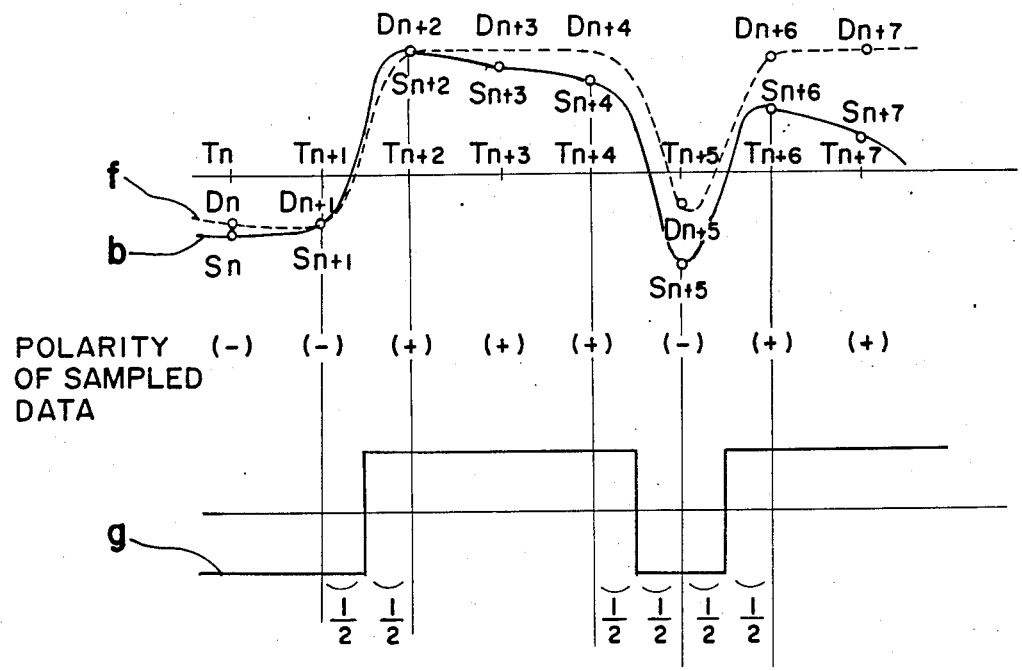
FIG. 9 is a graph showing waveforms describing the operation of the second embodiment.
Figure 9:
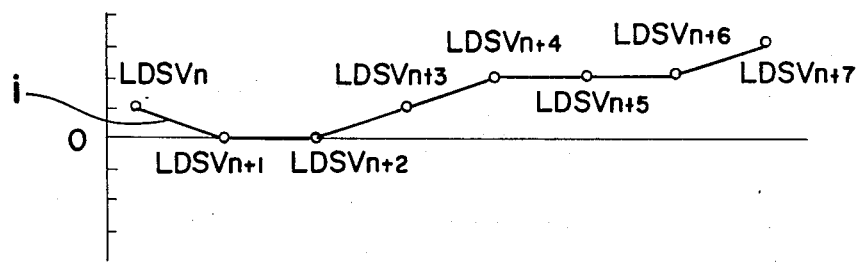
Figure 9:
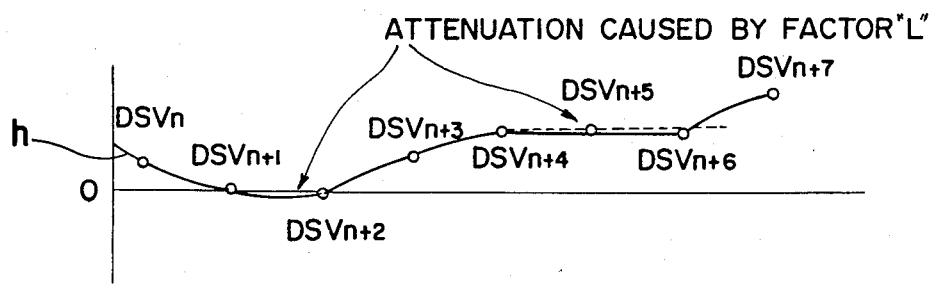

In the second embodiment, whenever the zero crossing point (ZCP) is detected by EXCLUSIVE OR gate 14, it is automatically assumed that the ZCP is located exactly at the middle of the two sampling points. Accordingly, for the amount $(1-2t)$, $t=\frac{1}{2}$ can be applied (FIG. 9, waveform g). Thus, in the second embodiment, the amount $(1-2t)$ will always result in zero. Accordingly, in the wave shaping circuit shown in FIG. 8, "0" generator 20' is provided in place of the circuit for calculating the amount $(1-2t)$. Therefore, in the second embodiment, the following equations are used for the two cases.

(i) Same Polarity Case $$D_n = S_n + DSV_{n-1} \times M \tag{1}$$

$$DSV_n = DSV_{n-1} \times L + \text{Sign} \times K \tag{4}$$

(ii) Different Polarity Case $$D_n = S_n + DSV_{n-1} \times M \tag{1}$$

$$DSV_n = DSV_{n-1} \times L \tag{11'}$$

Equation (11') indicates that under the second embodiment, no unit difference is added to the summed difference multiplied by coefficient L when the ZCP is detected.

THIRD EMBODIMENT

Figure 10:
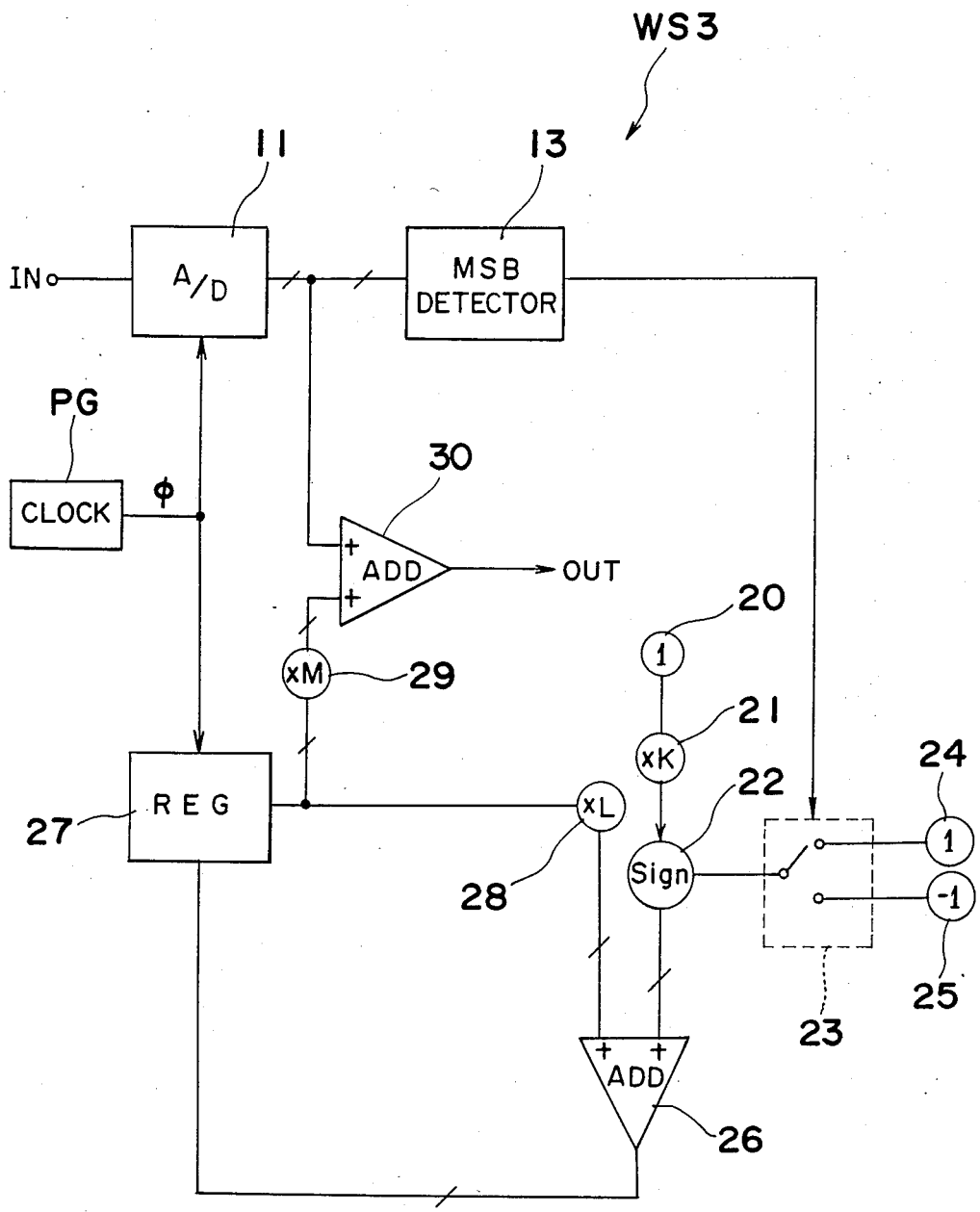
FIG. 10 is a circuit diagram of a wave shaping circuit according to a third embodiment of the present invention.

Referring to FIG. 10, a wave shaping circuit WS3 according to a third embodiment of the present invention is shown. When compared with the previous embodiments, the circuit for calculating the amount $(1-2t)$ and the circuit for detecting the presence of the ZCP are eliminated. In other words, circuit elements 15, 16 17 and 18 (FIG. 3), and circuit elements 12 (or 12'), 13' and 14 (FIG. 3 or 8) are eliminated.

Figure 11:
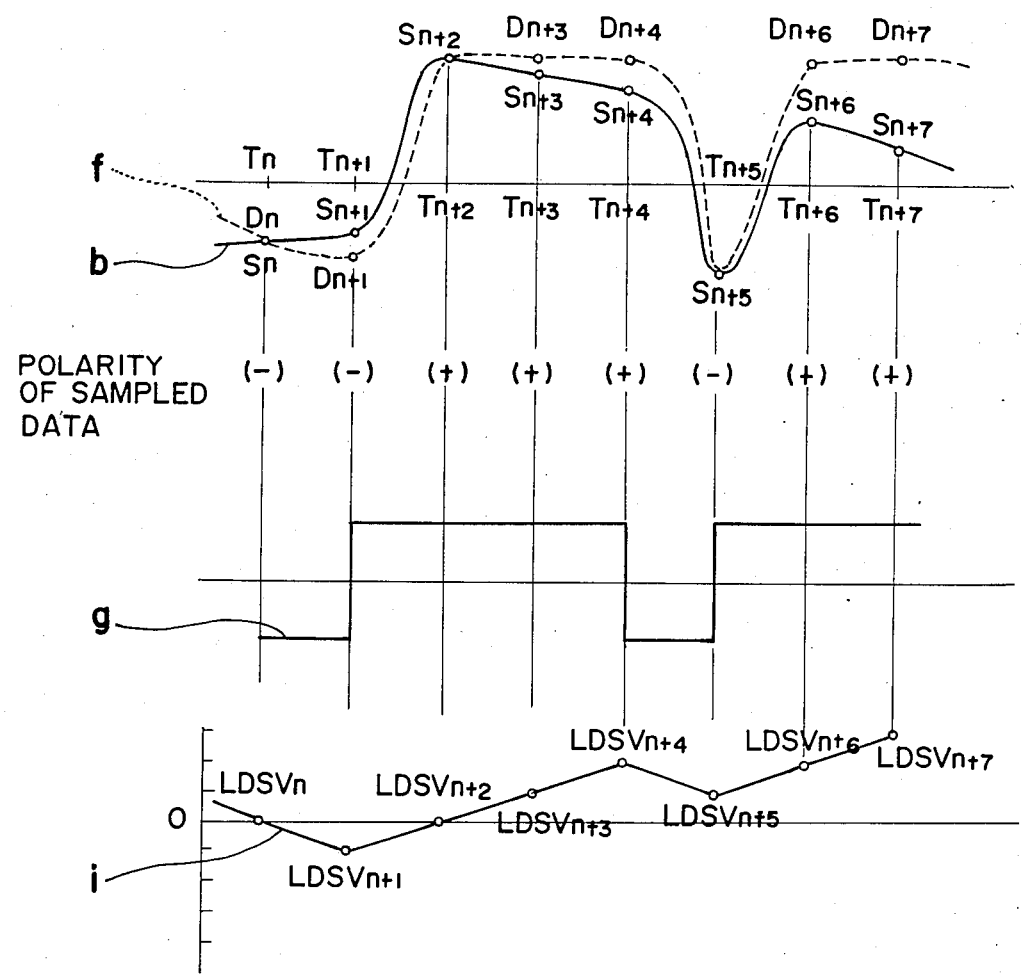
FIG. 11 is a graph showing waveforms describing the operation of the third embodiment.
Figure 11:
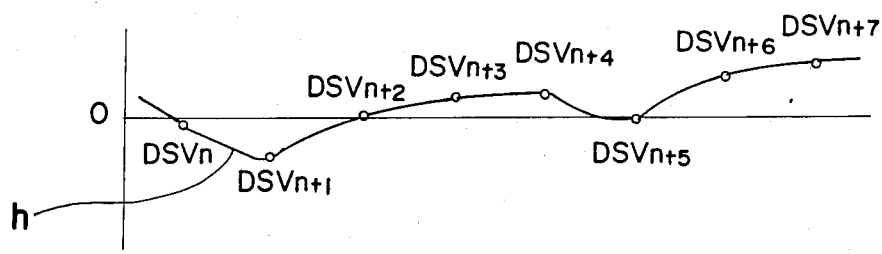

In the third embodiment, whenever the zero crossing point (ZCP) is present, it is automatically assumed that the ZCP is located exactly at the beginning of a period between sampling points. For example, as shown by waveform b in FIG. 11, when the ZCP is located between the sampling times $T_{n+1}$ and $T_{n+2}$, it is assumed that the ZCP is present at $T_{n+1}$, as shown by waveform g. Accordingly, for the amount $(1-2t)$, $t=0$ can be applied. Thus, in the third embodiment, the amount $(1-2t)$ will always result in one. Thus, as indicated by equation 11'' below, the formula for obtaining the difference $DSV_n$ for the two cases (i) and (ii) will be the same. Accordingly, in the third embodiment, it is not necessary to detect whether it is a case (i) or whether it is a case (ii). From this viewpoint, EXCLUSIVE OR gate 14 and its associated elements 12 and 13 is eliminated. Furthermore, since $(1-2t)$ is always assumed to be as "1", elements 15, 16, 17 and 18 for calculating the amount $(1-2t)$ are eliminated. Accordingly, in the wave shaping circuit shown in FIG. 10, "1" generator 20 is directly connected to multiplier 21. As understood from the foregoing, in the second embodiment, the following equations are used for the two cases.

(i) Same Polarity Case $$D_n = S_n + DSV_{n-1} \times M \tag{1}$$

$$DSV_n = DSV_{n-1} \times L + \text{Sign} \times K \tag{4}$$

(ii) Different Polarity Case $$D_n = S_n + DSV_{n-1} \times M \tag{1}$$

$$DSV_n = DSV_{n-1} \times L + \text{Sign} \times K \tag{11''}$$

Equations (4) and (11'') indicate that under the third embodiment, the same amount of the unit difference ($\text{Sign} \times K$) is added for both cases (i) and (ii).

COMBINATION WITH A DISABLING CIRCUIT

When the magnetic tape surface is covered by some unwanted material, such as a paper, or dirt, or when the tape surface is scratched, no signal will be produced from equalizer 4 for a period of time. This is called a burst. The period of on signal is called a burst period. During the burst period, the level of the signal from equalizer 4 is not completely at zero, but a very weak signal is present, and it is either in a positive side or in a negative side. Hereinafter, a case when a very weak positive signal is present during a burst period will be described.

Figure 13:
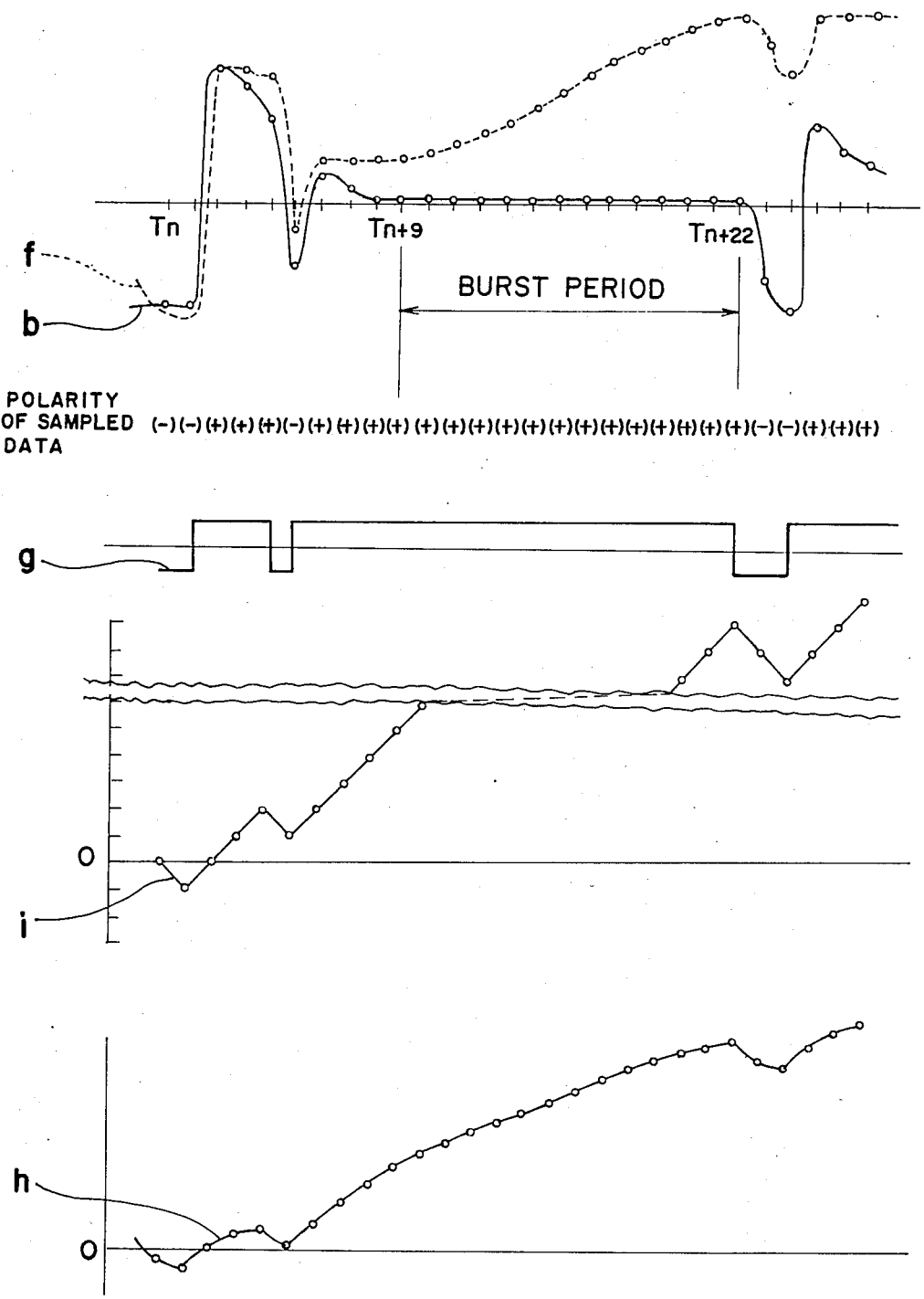
FIGS. 13 and 14 are graphs showing waveforms describing the operation of the embodiment shown in FIG. 12.

Referring to FIG. 13, the burst period is shown from sampling time $T_{n+9}$ to $T_{n+22}$. During the burst period, the signal is in the positive side. Therefore, switching circuit 23 (FIG. 10) is always connected to "1" generator 24. Thus, after each sampling cycle, the difference $DSV_n$ stored in register 27 will be increased gradually due to the sum from adder 26. Thus, the corrected signal (waveform f) as shown in FIG. 13 gradually increases during the burst period.

To avoid such an increase, a disabling circuit is coupled with the wave shaping circuit of the present invention. One embodiment of the disabling circuit is described hereinbelow.

Figure 12:
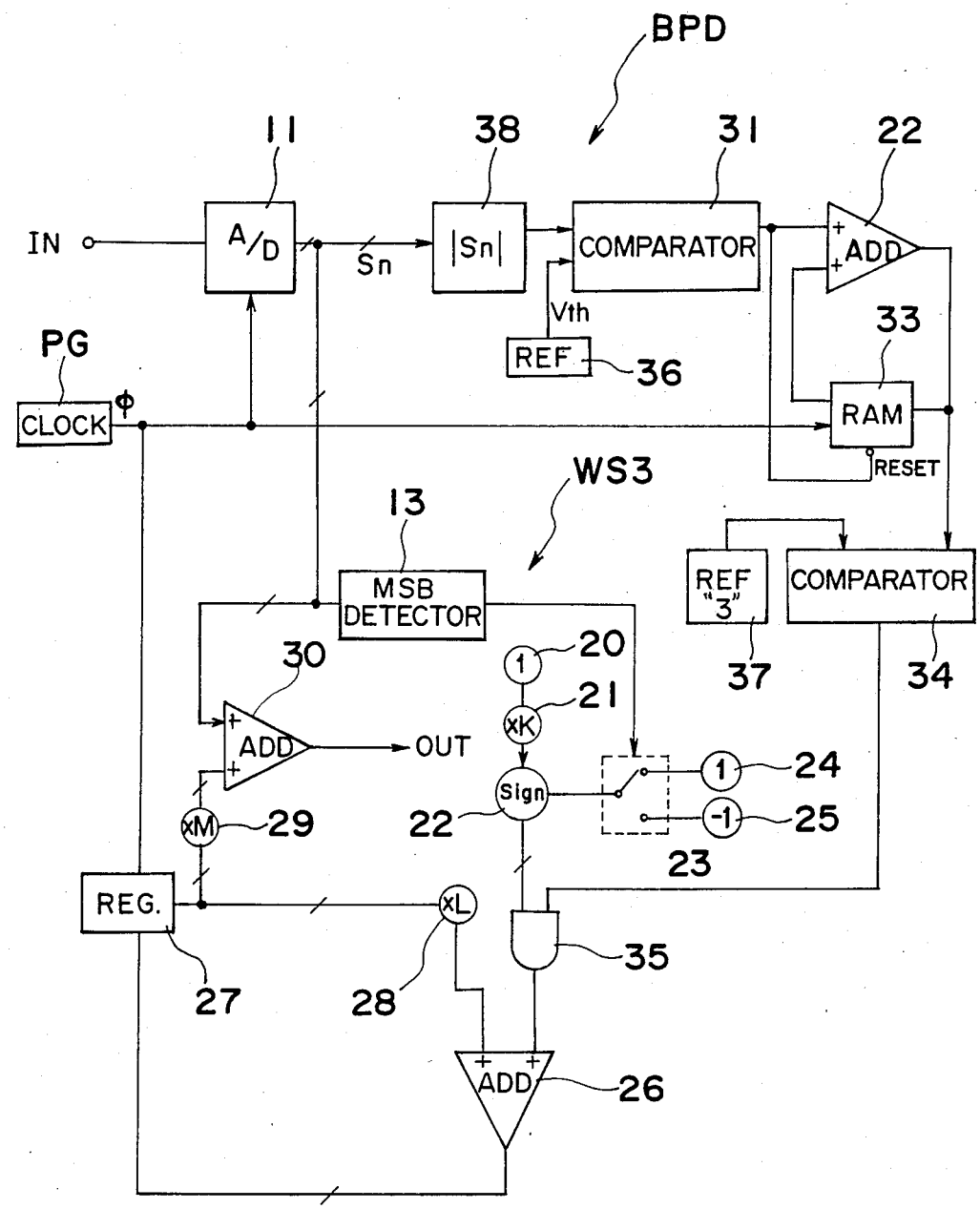
FIG. 12 is a circuit diagram of a wave shaping circuit of the third embodiment further provided with a disabling circuit.
Figure 14:
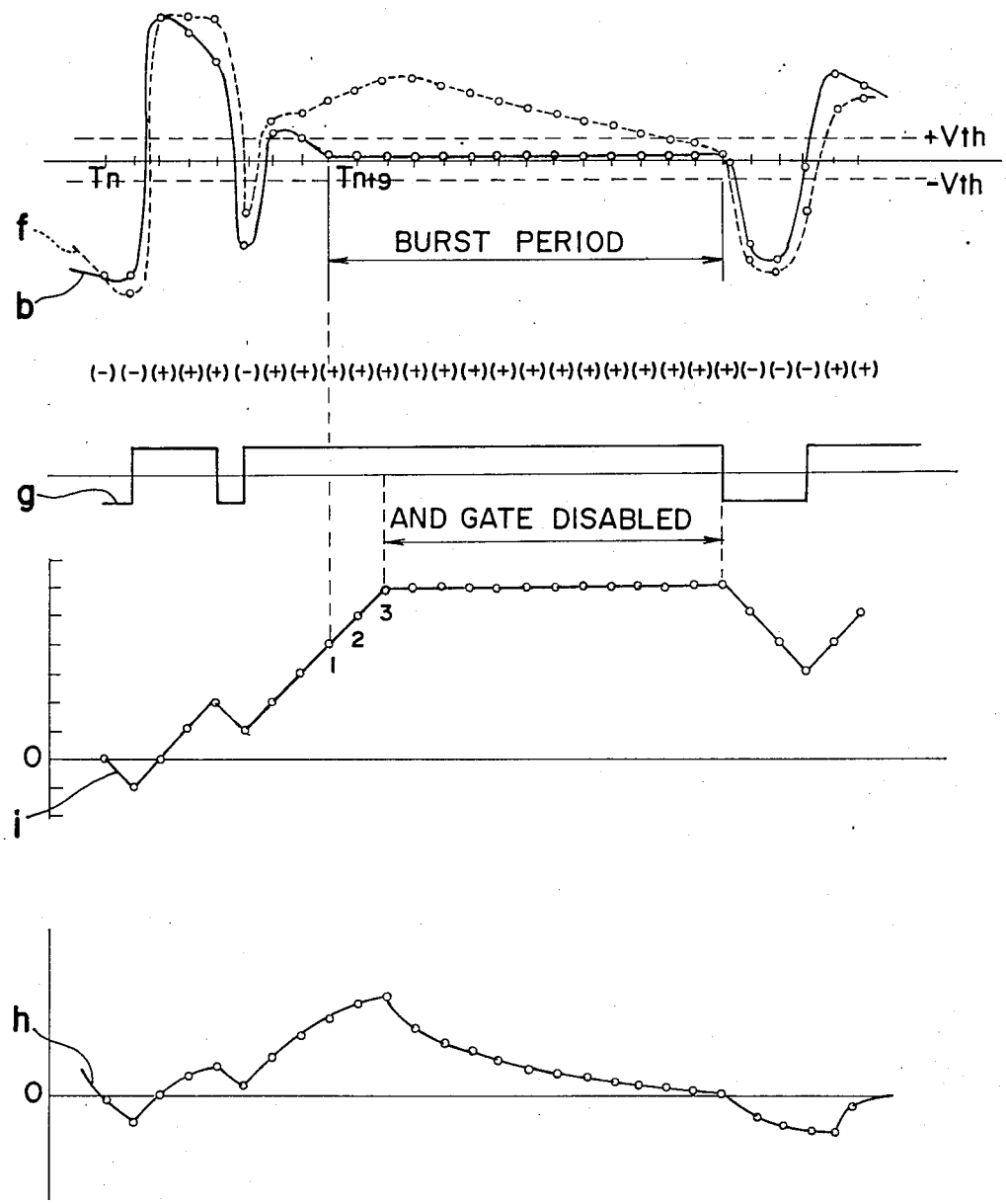

Referring to FIG. 12, wave shaping circuit WS3 of the third embodiment is coupled with a disabling circuit BPD which comprises an absolute-value circuit 38 and a comparator 31 for comparing the absolute value of the obtained signal $S_n$ with a predetermined threshold level Vth from a reference generator 36. The threshold level Vth is selected at a relatively low level, such as shown in FIG. 14.

When the absolute value of the obtained signal $S_n$ is greater than the threshold level Vth, comparator 31 produces a "0" for resetting a RAM 33. Thus, RAM 33 also produces "0". Therefore, in this case, adder 32 adds the "0" from comparator 31 and the "0" from RAM 33, and produces the sum "0", which is stored in RAM 33.

When the absolute value of the obtained signal $S_n$ is smaller than the threshold level Vth, comparator 31 produces a "1" which is applied to an adder 32 for adding the "1" with a number stored in a RAM 33. Initially RAM 33 is stored with "0". Therefore, when the "1" is produced from comparator 31 for the first time, adder adds the "1" from comparator 31 and "0" from RAM 33, and produces the sum "1", which is stored in RAM 33. Then, in the next sampling cycle, if the absolute value of the obtained signal $S_{n+1}$ is smaller than the threshold level Vth, comparator 31 again produces a "1" which is applied to an adder 32. In this case, adder 32 adds the "1" from comparator 31 and the "1" from RAM 33, thereby producing a sum "2", which is stored in RAM 33 as a new data. In this manner, RAM 33 counts the number of "1"s produced consecutively from comparator 31. Therefore, the number stored in RAM 33 represents the number of repetition of sampling cycles with the sampled signal nearly equal to zero level.

The sum of the number stored in RAM 33 and the "1" from comparator 31 is also applied to another comparator 34. Comparator 34 is coupled with a reference generator 37 which produces a predetermined number. For example, according to the disclosed embodiment, reference generator 37 produces a "3". When the signal obtained from adder 32 becomes greater than "3", comparator 34 produces a LOW level signal indicating that the burst is present. The LOW level signal from comparator 34 is applied to an AND gate 35. Thus, AND gate 35 is disabled to stop the supply of the signal +K to adder 26. In this case, adder 26 merely transmits the output of multiplier 28 to register 27. Since "L" is between 1 and 0, the amount stored register 27 will decrease exponentially. Thus, as shown by a waveform f in FIG. 14, the corrected signal may increase for three sampling cycles after the beginning of the burst period, but after that, the corrected signal gradually decreases toward zero. Therefore, during the burst period, the corrected signal can be maintained at the zero level.

According to the present invention, the DC component contained in the signal produced from equalizer 4 is eliminated by calculating a difference DSV which changes exponentially. Therefore, the signal correction can be accomplished with a high accuracy. Furthermore, since the wave shaping circuit, as well as the disabling circuit, is formed to process the signals in digital form, the circuit may be assembled in an IC chip.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. A wave shaping circuit comprising:
   digital sampling means for sampling an input signal and producing a digital signal;
   sign detecting means responsive to said digital sampling means for detecting whether the sampled digital signal has a positive value or a negative value;
   unit difference generating means responsive to said sign detecting means for generating a unit difference which is equal to a difference increase, during one sampling cycle, in a positive or negative direction, as detected by said sign detecting means;
   storing means for storing a summed difference obtained in a previous sampling cycle;
   multiplying means for multiplying said summed difference with a predetermined coefficient which is between 0 and 1 to produce an adjusted summed difference;
   first adder means responsive to said multiplying means and said unit difference generating means, for adding said adjusted summed difference with said unit difference, and for supplying the added result of said first adder means to said storing means to cause storing of this added result; and
   second adder means responsive to said storing means and said digital sampling means, for adding said digital signal with said summed difference stored in said storing means to produce a corrected signal.

2. A wave shaping circuit as claimed in claim 1, wherein said unit difference generating means comprises:
   first signal generating means for generating a first signal representing an amount of unit difference obtained when a zero crossing point is present in said input signal during the sampling cycle;
   second signal generating means for generating a second signal representing an amount of unit difference obtained when no zero crossing point is present in said input signal during the sampling cycle;
   zero-crossing point detecting means connected to said signal detection means for detecting a zero crossing point;
   switching means, connected to said first and second signal generating means, for selecting a first position when the zero crossing point is detected so as to permit said first signal to pass therethrough, or selecting a second position when the zero crossing point is not detected so as to permit said second signal to pass therethrough; and
   multiplying means connected to said switching means for multiplying together said signal which passed through said switching means; a predetermined constant; and a polarity determined by said sign detecting means.

3. A wave shaping circuit as claimed in claim 2, wherein said first signal generating means comprises:
   position detecting means responsive to said digital sampling means for detecting the position of said zero crossing point within one sampling cycle and producing a position signal;
   doubling means connected to said position detecting means for doubling said position signal; and
   subtracting means connected to said doubling means for subtracting said doubled position signal from a constant value.

4. A wave shaping circuit as claimed in claim 2, wherein said first signal generating means comprises a first constant amount generating means.

5. A wave shaping circuit as claimed in claim 2, wherein said second signal generating means comprises a second constant amount generating means.

6. A wave shaping circuit as claimed in claim 1, wherein said unit difference generating means comprises:
   a constant amount generating means; and
   multiplying means for multiplying together a signal produced from said constant generating means, a predetermined constant, and a polarity determined by said sign detecting means.

7. A wave shaping circuit as claimed in claim 1, further comprising a disabling means responsive to said digital sampling means for disabling the adding of said unit difference to said summed difference when an absolute value of said input signal is smaller than a predetermined level.

8. A wave shaping circuit as claimed in claim 7, wherein said disabling means comprises:
   an absolute-value circuit responsive to said digital sampling means for producing an absolute value of said digital signal;
   first comparing means for comparing said absolute value with said predetermined level and producing a low indication signal indicating that the digital signal is nearly equal to a zero level;
   counting means responsive to said first comparing means for counting the number of time said low indication signal is produced continuously and producing a number counted value; and
   second comparing means for comparing said number counted value with a predetermined number and producing a disabling signal when said number counted value becomes greater than said predetermined number.

* * * * *